US012770901B2

(12) United States Patent
Kemmer

(10) Patent No.: US 12,770,901 B2
(45) Date of Patent: Oct. 20, 2026

(54) METHOD FOR OPERATING A FUEL-CELL SYSTEM

(71) Applicant: Robert Bosch GmbH, Stuttgart (DE)

(72) Inventor: Helerson Kemmer, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 507 days.

(21) Appl. No.: 18/555,839

(22) PCT Filed: Apr. 22, 2022

(86) PCT No.: PCT/EP2022/060675
§ 371 (c)(1),
(2) Date: Oct. 17, 2023

(87) PCT Pub. No.: WO2022/229014
PCT Pub. Date: Nov. 3, 2022

(65) Prior Publication Data

US 2024/0243311 A1 Jul. 18, 2024

(30) Foreign Application Priority Data

Apr. 30, 2021 (DE) ..................... 10 2021 204 367.4

(51) Int. Cl.
*H01M 8/04* (2016.01)
*H01M 8/04228* (2016.01)
(Continued)

(52) U.S. Cl.
CPC ... *H01M 8/04228* (2016.02); *H01M 8/04303* (2016.02); *H01M 8/0432* (2013.01); (Continued)

(58) Field of Classification Search
None
See application file for complete search history.

(56) References Cited

U.S. PATENT DOCUMENTS

2012/0077102 A1* 3/2012 Morita ................ H01M 16/006 429/429

FOREIGN PATENT DOCUMENTS

DE 102007059999 A1 7/2008
DE 102011109907 A1 3/2012
(Continued)

OTHER PUBLICATIONS

Translation of International Search Report for Application No. PCT/EP2022/060675 dated Nov. 9, 2022 (2 pages).

*Primary Examiner* — Jelitza M Perez
(74) *Attorney, Agent, or Firm* — Michael Best & Friedrich LLP

(57) ABSTRACT

The invention relates to a method for operating a fuel-cell system (100), comprising:

- initiating a process of deactivating the fuel-cell system (100),
- recording a fuel throughput (D(t)) through a region (H, M, L) of an anode system (20) during the deactivation process,
- ending the process of deactivating the fuel-cell system (100),
- accumulating, from the recorded fuel throughput (D(t)), an amount of fuel (KD(t)) that has been passed through the region (H, M, L) of the anode system (20) during the deactivation process,
- calculating a pressure profile (p(t)) in the region (H, M, L) of the anode system (20) during the deactivation process in dependence on the accumulated amount of fuel (KD(t)),
- raising the calculated pressure profile (p(t)) by a pressure difference (dp) between a desired end pressure (peSoll) and an end pressure (pelst) according to the calculated pressure profile (p(t)), (Continued)

determining a deactivation time (tab) for deactivating the supply of fuel in dependence on the raised pressure profile (p(t)+dp) and an initial pressure (paIst) in the region (H, M, L) of the anode system (20).

11 Claims, 7 Drawing Sheets

(51) Int. Cl.

| | |
|---|---|
| ***H01M 8/04303*** | (2016.01) |
| ***H01M 8/0432*** | (2016.01) |
| ***H01M 8/0438*** | (2016.01) |
| ***H01M 8/04746*** | (2016.01) |
| ***H01M 8/04992*** | (2016.01) |

(52) U.S. Cl.

CPC ... *H01M 8/04388* (2013.01); *H01M 8/04753* (2013.01); *H01M 8/04992* (2013.01)

(56) References Cited

FOREIGN PATENT DOCUMENTS

| | | | |
|---|---|---|---|
| DE | 102016203169 | A1 | 8/2017 |
| DE | 102018003278 | A1 | 10/2019 |
| EP | 2026396 | A1 | 2/2009 |
| JP | 2013182690 | A | 9/2013 |
| JP | 2014026914 | A | 2/2014 |

* cited by examiner

METHOD FOR OPERATING A FUEL-CELL SYSTEM

BACKGROUND

The invention relates to a method for operating a fuel-cell system, in particular when deactivating the fuel-cell system, preferably in order to determine a suitable deactivation time for deactivating a supply of fuel, according to the disclosure. In addition, the invention relates to a corresponding control unit and a corresponding computer program product.

Fuel-based, e.g., hydrogen-based, fuel-cell systems are considered to be the mobility concept of the future, because they only emit water as exhaust gas and allow for fast fueling times. Fuel cell systems mostly comprise multiple fuel cells assembled into a stack. Fuel cell systems need air and fuel, e.g., hydrogen, for the chemical reaction. The waste heat of the stack is dissipated by means of a cooling circuit and released to the environment at the main vehicle radiator.

The fuel, e.g., hydrogen, is stored in a high-pressure tank. The tank is closed by a shut-off valve. There is a prevailing pressure of up to about 840 bar between the shut-off valve and a subsequent pressure regulator. After the pressure reducer, the pressure is between 10 bar and 30 bar. A pressure between 1 bar and 4 bar prevails after a subsequent pressure regulator. The pressure regulator typically has a pressure shut-off function. If this is not the case, an additional shut-off valve is placed there. Pressure sensors are present in all pressure regions for diagnosis and control.

The tank, the shut-off valve, the pressure reducer, and the pressure regulator form components of an anode system. To operate the fuel-cell system, the shut-off valves of the anode system are opened. When the system is shut down, the shut-off valves of the anode system are closed. Due to the high tightness of the anode system, there is a high pressure level in the anode system, e.g. up to about 700 bar in the high-pressure region and between 15 bar and 30 bar in the mid-pressure region. For this reason, high requirements are placed on the components of the anode system in terms of the pressure resistance for the lifetime of the fuel-cell system, e.g., for 130,000 hours. These requirements have a significant impact on the materials used, as well as the design and thus the cost of the components of the anode system.

SUMMARY

The present invention provides a method for operating a fuel-cell system, in particular when deactivating the fuel-cell system, preferably in order to determine a suitable deactivation time for deactivating a supply of fuel, having the features of the disclosure. In addition, the invention provides a corresponding control unit and a corresponding computer program. Of course, features and details described in connection with the different embodiments and/or aspects of the invention also apply in connection with the other embodiments and/or aspects of the invention, and respectively vice versa, so that with respect to the disclosure, mutual reference to the individual embodiments and/or aspects of the invention is or can always be made.

The present invention provides according to one aspect: a method for operating a fuel-cell system, in particular when deactivating the fuel-cell system, preferably in order to determine a suitable deactivation time for deactivating a supply of fuel. The method can be carried out, for example, during a calibration phase of the fuel-cell system, in particular once, and/or during a normal operation of the fuel-cell system, in particular multiple times. The method can thus be carried out in order to calibrate and/or operate the fuel-cell system in normal operation, which means in the normal operation of a fuel-powered vehicle.

The method comprises the following steps:

initiating a process of deactivating the fuel-cell system, recording a fuel throughput through a region, e.g., a mid-pressure region, which can lie between a pressure reducer and a pressure regulator, for example, or through another region of an anode system during the deactivation process, ending the process of deactivating the fuel-cell system, accumulating, from the recorded fuel throughput, an amount of fuel that has been passed through the region of the anode system during the deactivation process, calculating a pressure profile in the at least one region of the anode system during the deactivation process in dependence on the accumulated amount of fuel, in particular under the assumption that the supply of fuel was interrupted upon initiation of the deactivation process, raising the calculated pressure profile by a pressure difference between a desired end pressure and an end pressure according to the calculated pressure profile, determining a deactivation time for deactivating the supply of fuel in dependence on the raised pressure profile and an initial pressure in the region of the anode system.

and, in particular, using the determined deactivation time in order to deactivate the supply of fuel, preferably in at least one subsequent process of deactivating the fuel-cell system.

The supply of fuel can be deactivated using a shut-off valve downstream of a fuel tank.

The initial pressure in the at least one region of the anode system can be derived from the calculated pressure profile.

The process of deactivating the fuel-cell system can also be referred to as a deactivation process. The deactivation process can comprise at least one of the following two phases, such as e.g., a drying phase of an anode space in a stack of the fuel-cell system and/or a bleed-down phase for consuming the remaining fuel in the anode space of the stack.

In known methods, upon initiation of the deactivation process, the shut-off valve downstream of the tank is not closed immediately. There is usually a delay in order to ensure that at least the drying phase of the anode space is completed. Thereafter, the remaining fuel in the anode space of the stack is consumed during the bleed-down phase. In the bleed-down phase, the stack is mostly shorted via a bleed-down resistor. Thus, the deactivation process can take a relatively long time and consume more fuel that cannot be effectively exploited than is absolutely necessary in order to complete the deactivation process properly.

The invention provides that, at least once in a calibration phase of the system, the process of deactivating, from Beginning (meaning the time when the electrical power is no longer needed by the fuel-cell system, e.g., when parking the fuel-powered vehicle) to end (meaning the time when the stack is dry and has no fuel on the anode side), is monitored and evaluated in order to determine an improved deactivation time for deactivating the supply of fuel when deactivating the fuel-cell system.

A suitable deactivation time is theoretically a time when, after closing the shut-off valve, the remaining fuel in the anode system is sufficient in order to properly complete the deactivation process, i.e., in order to carry out the drying phase of the anode space as desired, and to properly complete the bleed-down phase.

The invention provides that the fuel throughput is recorded through at least one region, in particular a mid-pressure region, of the anode system until the deactivation process has been completed.

The fuel throughput can be determined by a consumption determination method, e.g., by the opening state of the pressure regulator in the anode system, which can also be referred to as a hydrogen dosing valve, by the decrease in tank pressure, etc.

From the integral of the time profile of the fuel throughput, the accumulated amount of fuel is mapped, which corresponds to the amount of fuel consumed during the monitored deactivation process.

Thereafter, a theoretical consideration is made in which the assumption that the supply of fuel was deactivated at the beginning of the deactivation process applies.

The idea according to the invention is that, from the consumed amount of fuel, a corresponding pressure profile or pressure drop can be calculated. For example, the ideal gas equation or the like can be used for this purpose.

The calculated pressure profile can fall below zero bar or result in an end pressure below zero, because, during the deactivation process being carried out, the supply of fuel is of course not deactivated immediately upon initiation of the deactivation process.

In the next step, the pressure profile is computationally raised by the difference between the desired end pressure, (so-called target end pressure, e.g., between 1 bar and 3 bar), and the theoretically determined end pressure. The new, raised, theoretical pressure profile has an intersection point with the initial pressure, e.g., 15 bar. The corresponding time point for this intersection is the time point for the deactivation of the shut-off valve, i.e., the appropriate deactivation time.

Advantageously, with the aid of the invention, the pressure in the anode system can be significantly reduced when deactivating the fuel-cell system, e.g., from 15 bar to e. g. 1 bar. Also, using the invention, a reduction of the pressure load on the components of the anode system can be enabled, because the shut-off valve is closed in a timely manner during the deactivation process or deactivation process. In this way, a relaxing of the requirements for the components of the anode system can be brought about, such as the pressure reducer, pressure regulator, pressure sensors, etc. In addition, this can reduce system costs and enable the use of inexpensive materials. Moreover, this can reduce the added consumption of fuel upon deactivating the system.

In principle, the idea according to the invention can be applied to each region of the anode system, not only for the mid-pressure region.

Furthermore, for example, in at least one subsequent process of deactivating the fuel-cell system, the method can comprise at least one of the following steps:

- initiating a process of deactivating the fuel-cell system,
- monitoring the time since the initiation of the deactivation process for excess of the determined deactivation time,
- deactivating the supply of fuel when the time has reached the determined deactivation time,
- ending the deactivation process.

In this way, a subsequent process of deactivating the fuel-cell system, e.g., in normal operation of the fuel-cell system, e.g., when parking the vehicle, can be carried out efficiently. The time needed in order to carry out the deactivation process can be reduced. The pressure in the anode system can be reduced. The compressive load on the components in the anode system can be reduced. The fuel consumption during the deactivation process can also be reduced.

Furthermore, for example, in at least one subsequent process of deactivating the fuel-cell system, the method can comprise at least one of the following steps:

- initiating a process of deactivating the fuel-cell system,
- monitoring the time since the initiation of the deactivation process for excess of the determined deactivation time,
- deactivating the supply of fuel when the time has reached the determined deactivation time,
- monitoring a current pressure in the region of the anode system for falling below a minimum limit,
- activating the supply of fuel when the pressure has fallen below the minimum limit in order to raise the current pressure,
- deactivating the supply of fuel, in particular when a bleed-down phase of the fuel-cell system has been properly completed,
- ending the deactivation process.

Thus, the method can be carried out with increased safety and flexibility, in particular during a normal operation of the fuel-cell system (100). Advantageously, the actually prevailing pressure in the relevant region of the anode system can be considered in an improved manner in order to ensure that the pressure does not fall below a determined minimum limit. In addition, the possibility can thus be created to adjust a theoretically calculated deactivation time.

Advantageously, the method can comprise at least one of the following steps:

- adjusting the determined deactivation time, in particular in dependence on the monitoring of the current pressure.

For adjusting the determined deactivation time, the determined deactivation time is increased, for example one time, by a lump sum. In addition, it is contemplated that, in order to adjust the determined deactivation time, the determined deactivation time is recalculated. Thus, the method can respond to possible changes in the system and/or environment of the fuel-cell system.

In order to reduce the computational effort in a control unit of the fuel-cell system, it is contemplated that the method is carried out at least by an external computing unit, in particular a cloud. It is contemplated that some method steps and/or calculations can be outsourced in full or in part to the external computing unit.

According to a further advantage, when carrying out the method, in particular when calculating the pressure profile, at least one operating parameter of the fuel-cell system, in particular the temperature and/or the ambient temperature, is considered. In this way, the accuracy of determining the appropriate deactivation time for deactivating a supply of fuel can be increased.

The method can advantageously be carried out by a control unit of the fuel-cell system.

A corresponding control unit provides a further aspect of the invention. A computer program can be stored in a memory unit of the control unit in the form of a code, which, when the code is executed by a computing unit of the control unit, carries out a method that can proceed as described above. Using the control unit according to the invention, the same advantages can be achieved as described above in connection with the method according to the invention. In the present case, reference to these advantages is made in full.

The control unit can be in a communication link with sensors of the anode system in order to, for example, determine the fuel throughput and/or the measure pressure. The control unit can control the actuators in the anode system, such as the shut-off valve, the pressure reducer, and/or the pressure regulator, in order to carry out the method.

In addition, the control unit can be in a communication link with an external computing unit in order to outsource some method steps and/or calculations, in whole or part, to the external computing unit.

According to a further aspect, the invention provides a computer program product comprising commands which, when executed by a computer, such as the computing unit of the control unit, cause the computer to carry out the method which can proceed as described above. Using the computer program product, the same advantages can be achieved as described above in connection with the method according to the invention and/or the control unit according to the invention. In the present case, reference to these advantages is made in full.

BRIEF DESCRIPTION OF THE DRAWINGS

The invention and its further developments, as well as its advantages, will be explained in further detail below with reference to drawings. The drawings schematically show.

DETAILED DESCRIPTION

In the various figures, like parts of the invention are always given the same reference numbers, for which reason they are typically only described once.

Figure 1:
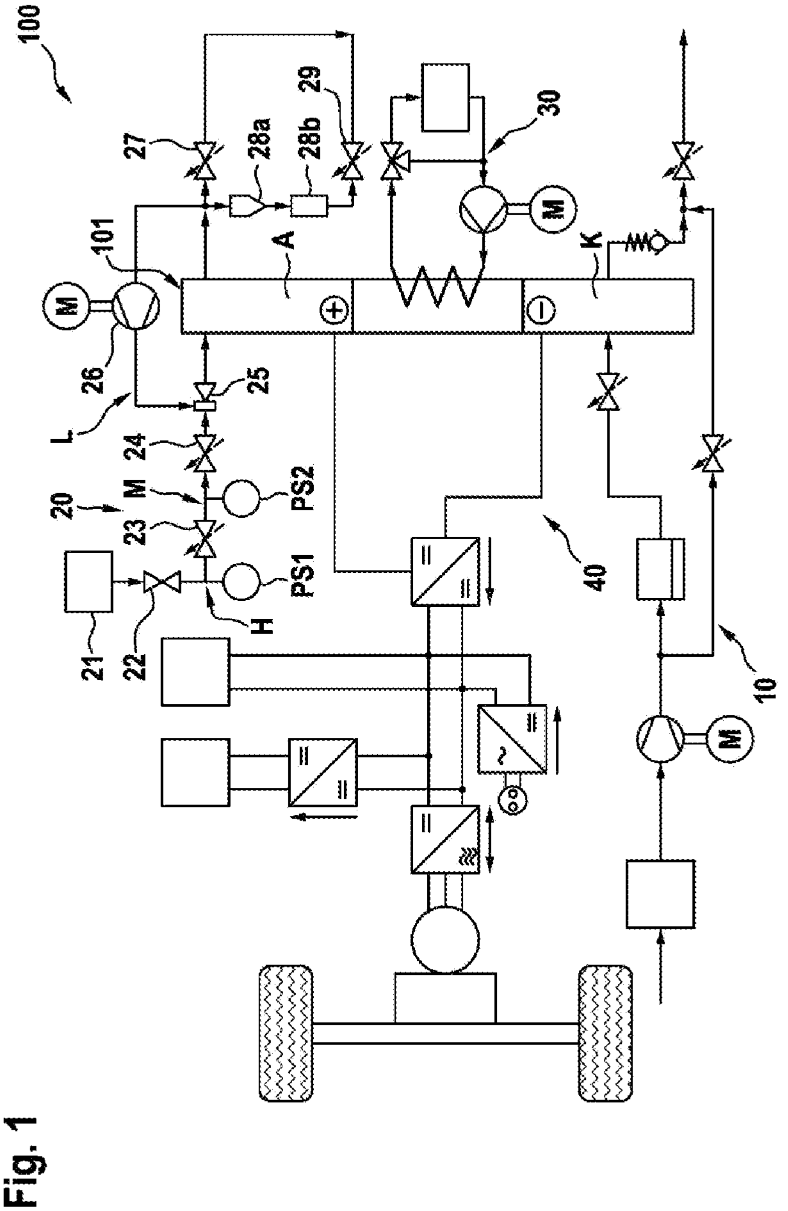
FIG. 1 an exemplary fuel-cell system in the sense of the invention.

FIG. 1 shows a possible fuel-cell system 100 within the scope of the invention. The fuel-cell system 100 mostly comprises multiple fuel cells assembled into a stack 101. In addition, the fuel-cell system 100 comprises at least four subsystems 10, 20, 30, 40, including: a cathode system 10 to supply an oxygen-containing gas mixture to a cathode space K of the stack 101, an anode system 20 to supply a fuel-containing gas mixture to an anode space A of the stack 101, a cooling system 30 to temperature-control the stack 101, and an electric system 40 to dissipate the generated electrical power from the stack 101.

The anode system 20 comprises multiple components. The components used in order to supply fuel include a fuel tank 21, a shut-off valve 22, a pressure reducer 23, and a pressure regulator 24. The pressure regulator 24 can also have a shut-off function. If the pressure regulator 24 does not have a shut-off function, a separate shut-off valve can be provided at the input to the anode space A.

A high pressure region H of the anode system 20 is located between the shut-off valve 22 and the pressure reducer 23, in which there is a pressure up to about 840 bar during normal operation of the fuel-cell system 100. When deactivating the fuel-cell system 100, there can be a pressure of about 700 bar in the high pressure region H of the anode system 20.

Between the pressure reducer 23 and the pressure regulator 24, there is a mid-pressure region M of the anode system 20. In the mid-pressure region M, there is a pressure of between about 10 bar and about 30 bar in normal operation of the fuel-cell system 100. When deactivating the fuel-cell system 100, a pressure between about 15 bar and about 30 bar can be present in the mid-pressure region M of the anode system 20.

Between the pressure regulator 24 and the anode region A of the stack 101, there is a further pressure region L of the anode system 20, in which there is a pressure between about 1 bar and about 4 bar.

Furthermore, pressure sensors PS1, PS2 are placed at least in the high pressure region and/or in the mid-pressure region.

Due to high pressures in the anode system 20, high demands are placed on the components of the anode system 20 responsible for the supply of fuel. These components must provide a compressive resistance for the lifetime of the fuel-cell system 100, e.g., for 130,000 hours.

Further components in the anode system 20 are a jet pump 25 and a recirculation pump 26. Also, a purge valve 27, a water trap 28*a*, a water reservoir 28*b* for the trapped water, and/or a drain valve 29 can be provided in the anode system.

Using the following FIGS. 2 to 12, a method in the sense of the invention is described, which is used in order to operate a fuel-cell system 100, which can be configured, for example, according to FIG. 1. The method is carried, in particular, when deactivating the fuel-cell system 100, in order to determine a suitable deactivation time tab for deactivating a supply of fuel.

The method can be carried out one time, for example, during a calibration phase of the fuel-cell system 100, and/or multiple times, for example during a normal operation of the fuel-cell system 100, for example during parking of the vehicle.

Figure 2:
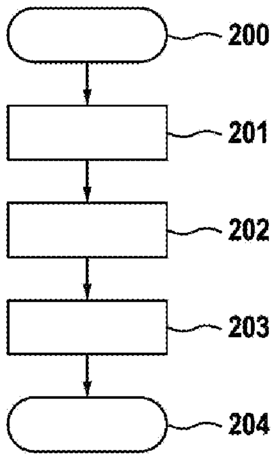
FIG. 2 an exemplary sequence of a further part of a method according to the invention.

As shown in FIG. 2, the method comprises the following steps:

200—initiating a process of deactivating the fuel-cell system 100,

201—recording a fuel throughput (D(t)) through a region H, M, L, for example a mid-pressure region M between the pressure reducer 23 and the pressure regulator 24, or through another region H, L of the anode system 20 during the deactivation process, wherein, in particular, the process of deactivating the fuel-cell system 100 can have the following phases:

202 a drying phase of the anode space A in the stack 101 of the fuel-cell system 100, and/or

203 a bleed-down phase for consuming the fuel remaining in anode space A of stack 101,

204 ending the process of deactivating the fuel-cell system 100.

Figure 3:
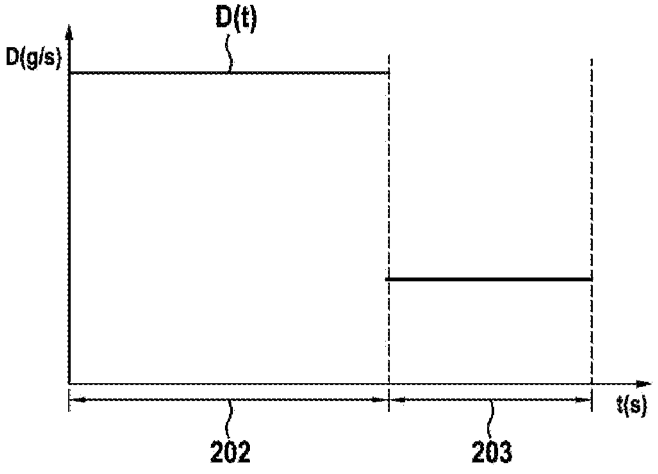
FIG. 3 an exemplary representation of a fuel throughput during a process of deactivating a fuel-cell system, FIG. 4 an exemplary sequence of a further part of a method according to the invention.

FIG. 3 shows an exemplary recorded fuel throughput D(t) in dependence on the time t during the process of deactivating the fuel-cell system 100. The fuel throughput can be determined by a consumption determination method, e.g., by the opening state of the pressure regulator 24, which can also be referred to as a hydrogen dosing valve, by the decrease in tank pressure, etc.

Figure 4:
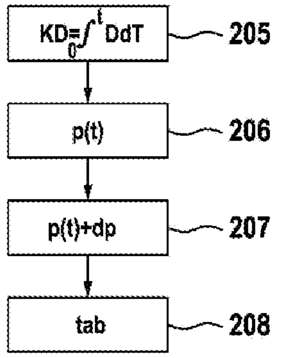
Figure 5:
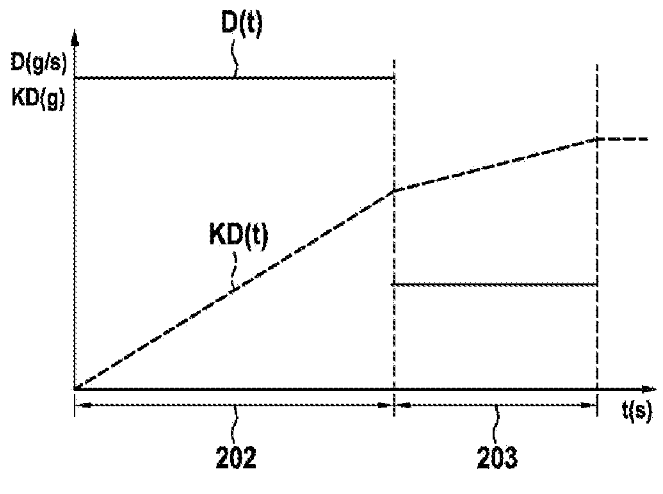
FIG. 5 an exemplary representation of an accumulated amount of fuel from a recorded fuel throughput during a process of deactivating a fuel-cell system, FIG. 6 an exemplary representation of a calculated pressure profile corresponding to an accumulated amount of fuel from a fuel throughput during a process of deactivating a fuel-cell system, FIG. 7 an exemplary representation of a calculated pressure profile and a raised pressure profile, FIG. 8 an exemplary representation of an intersection point between a raised pressure profile and an initial pressure, FIG. 9 an exemplary sequence of a further part of a method according to the invention.
Figure 6:
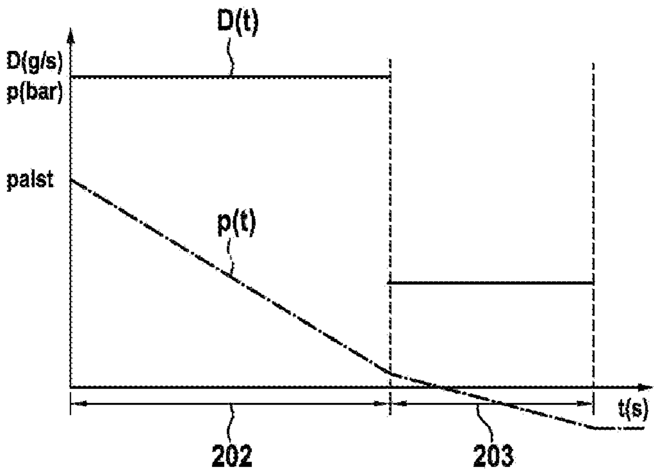
Figure 7:
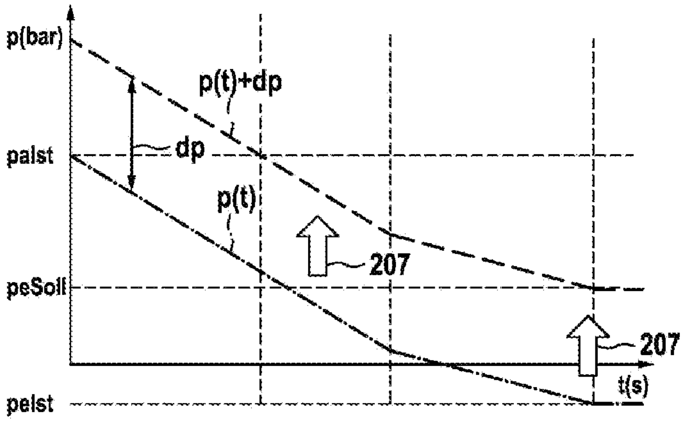
Figure 8:
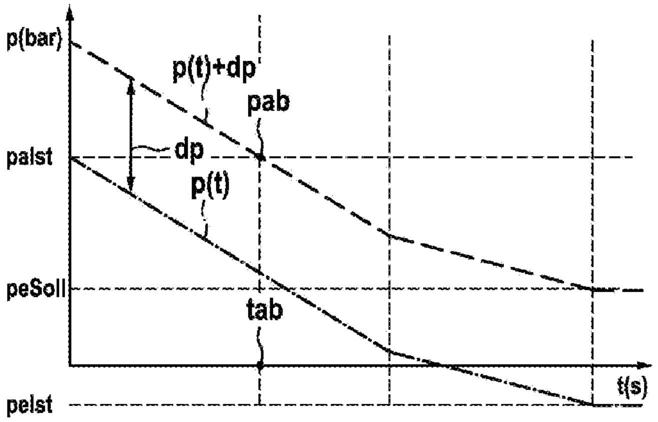

As shown in FIG. 4, the method comprises the following steps:

205 accumulating, from the recorded fuel throughput (D(t)), an amount of fuel KD(t) that has been passed through the region H, M, L of the anode system 20 during the deactivation process, cf. FIG. 5,

206 calculating a pressure profile p(t) in the region H, M, L of the anode system 20 during the deactivation process in dependence on the accumulated amount of fuel KD(t), cf. FIG. 6, in particular under the assumption that the supply of fuel was interrupted upon initiation of the deactivation process,

207 raising the calculated pressure profile p(t) by a pressure difference dp between a desired end pressure peSoll in the region H, M, L of the anode system 20 and an end pressure peIst according to the calculated pressure profile p(t), cf. FIG. 7,

208 determining a deactivation time tab for deactivating the supply of fuel in dependence on the raised pressure profile p(t)+dp and an initial pressure paIst in the region H, M, L of the anode system 20, cf. FIG. 8.

Figure 9:
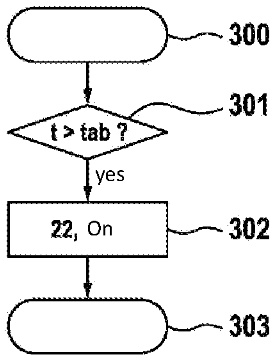
Figure 11:
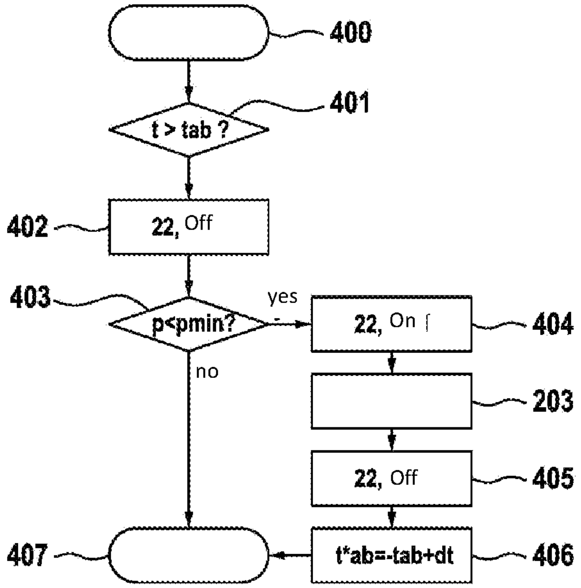

Furthermore, the determined deactivation time tab can be used in order to deactivate the supply of fuel, preferably in at least one subsequent process of deactivating the fuel-cell system 100, as shown in FIGS. 9 and 11.

The supply of fuel can be deactivated using the shut-off valve 22 downstream of a fuel tank 21.

The initial pressure paIst in the corresponding region H, M, L of the anode system 20 can be derived from the calculated pressure profile p(t).

Furthermore, when calculating the pressure profile p(t), at least one operating parameter of the fuel-cell system 100, such as the temperature T in this region H, M, L of the anode region 20 and/or the ambient temperature Tu, are considered.

A suitable deactivation time tab in the sense of the invention is theoretically a time when, after closing the shut-off valve 22, while deactivating the fuel-cell system 100, the remaining fuel in the anode system 20 is sufficient in order to properly complete the deactivation process, i.e. in order to carry out the drying phase 202 of the anode space 20 as desired, and to properly complete the bleed-down phase 203.

As shown in FIG. 5, the cumulative amount of fuel KD can be calculated from the integral of the time profile of the fuel throughput D. The cumulative amount of fuel KD corresponds in the sense of the invention to the amount of fuel KD consumed during the monitored deactivation process.

Then, an assumption is made that the supply of fuel has been deactivated at the beginning of the deactivation process, i.e., already in step 200.

The idea according to the invention is that, from the consumed amount of fuel KD, a corresponding pressure profile p(t) or pressure drop can be calculated, as illustrated in FIG. 6. For example, the ideal gas equation or the like can be used for this purpose.

In the next step 207, the pressure profile p(t) is computationally raised by the difference dp between the desired end pressure peSoll, a so-called target end pressure, e.g., in a range between 1 bar and 3 bar, and the theoretically determined end pressure peIst.

As shown in FIG. 8, the new, raised, theoretical pressure profile p(t)+dp has an intersection point Pab with the initial pressure paIst, e.g., in the amount of 15 bar. The corresponding time point tab for this intersection Pab is the time point tab for the deactivation of the shut-off valve 22, i.e., the appropriate deactivation time tab for the deactivation of the supply of fuel in the sense of the invention.

Using the invention, when deactivating the fuel-cell system 100, the pressure p in the anode system 20, in particular on the components used for the supply of fuel, can be significantly reduced. The compressive load on the components of the anode system 20 can also be reduced as a result. Thus, the requirements for the components of the anode system 20 can be reduced, so that system costs can be reduced and the use of inexpensive materials can be enabled. In addition, using the invention, the additional consumption of fuel can be reduced when deactivating the fuel-cell system 100.

In principle, the idea according to the invention is applicable to each region H, M, L of the anode system 20, not only for the mid-pressure region M.

FIG. 9 shows a possible sequence for at least one subsequent process of deactivating the fuel-cell system 100:

300 initiating a process of deactivating the fuel-cell system 100,

301 monitoring the time t since the initiation of the deactivation process for excess of the determined deactivation time tab,

302 deactivating the supply of fuel when the time t has reached the determined deactivation time tab, in particular by closing the shut-off valve 22,

303 ending the deactivation process.

Figure 10:
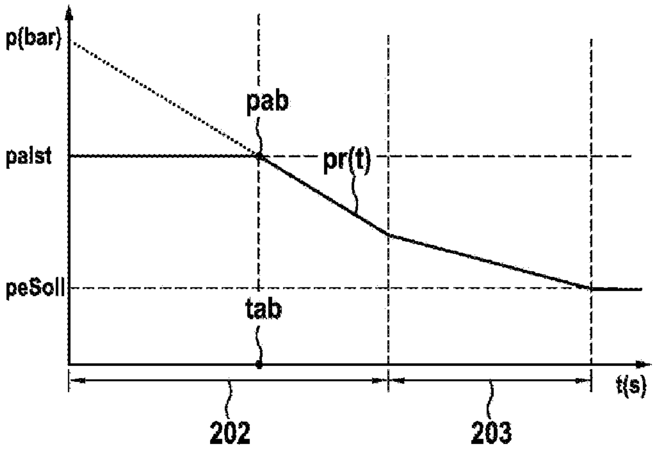
FIG. 10 an exemplary representation of a real-world pressure profile in a region of the anode system, FIG. 11 an exemplary sequence of a further part of a method according to the invention, and FIG. 12 an exemplary representation of a real-world pressure profile in a region of the anode system compared to a profile of a determined minimum limit for the pressure.

FIG. 10 shows a real-world pressure profile pr in the fuel-cell system 100 when carrying out the method according to FIG. 9.

Figure 12:
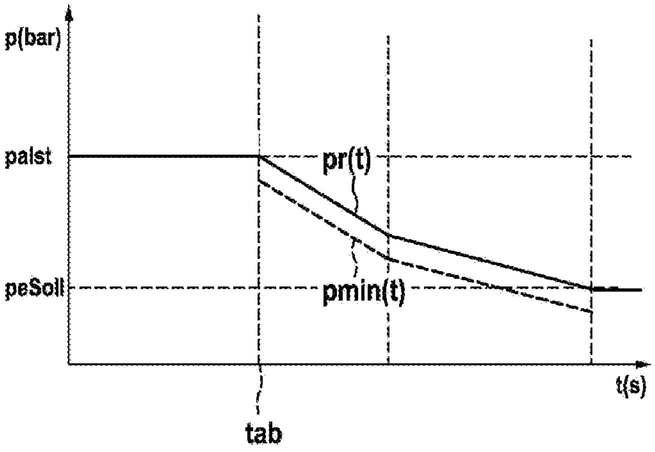

FIG. 11 shows a possible sequence for at least one subsequent process of deactivating the fuel-cell system 100:

400 initiating a process of deactivating the fuel-cell system 100,

401 monitoring the time t since the initiation of the deactivation process for excess of the determined deactivation time tab,

402 deactivating the supply of fuel when the time t has reached the determined deactivation time tab, in particular by closing the shut-off valve 22,

403 monitoring a current pressure p in the region H, M, L of the anode system 20 for falling below a minimum limit Pmin, which is shown by way of example in FIG. 12,

404 activating the supply of fuel when the pressure p has fallen below the minimum limit Pmin in order to raise the current pressure p in particular for opening the shut-off valve 22,

405 deactivating the supply of fuel, in particular when a bleed-down phase 203 of the fuel-cell system 100 has been properly completed,

407 ending the deactivation process.

Before step 407 or after step 407, the method can comprise at least one further step:

406 adjusting the determined deactivation time tab, in particular in dependence on the monitoring of the current pressure p.

For adjusting the determined deactivation time tab, the determined deactivation time tab is increased, for example one time, by a lump sum dt. In addition, it is contemplated that, in order to adjust the determined deactivation time tab, the determined deactivation time tab can be recalculated according to the method according to FIGS. 2 and 4.

The above description of the figures describes the present invention solely in the context of examples. Of course, individual features of the embodiments can be freely combined with one another, insofar as technically sensible, without leaving the scope of the invention.

The invention claimed is:

1. A method for operating a fuel-cell system (100), the method comprising:

initiating a process of deactivating the fuel-cell system (100), recording a fuel throughput (D(t)) through a region (H, M, L) of an anode system (20) during the deactivation process, ending the process of deactivating the fuel-cell system (100), accumulating, from the recorded fuel throughput (D(t)), an amount of fuel (KD(t)) that has been passed through the region (H, M, L) of the anode system (20) during the deactivation process, calculating a pressure profile (p(t)) in the region (H, M, L) of the anode system (20) during the deactivation process in dependence on the accumulated amount of fuel (KD(t)), raising the calculated pressure profile (p(t)) by a pressure difference (dp) between a desired end pressure (peSoll) and an end pressure (peIst) according to the calculated pressure profile (p(t)), and determining a deactivation time (tab) for deactivating the supply of fuel in dependence on the raised pressure profile (p(t)+dp) and an initial pressure (paIst) in the region (H, M, L) of the anode system (20).

2. The method according to claim 1, wherein in a subsequent process of deactivating the fuel-cell system (100)

the method comprises at least one of the following steps:

initiating a process of deactivating the fuel-cell system (100), monitoring the time (t) since the initiation of the deactivation process for excess of the determined deactivation time (tab), deactivating the supply of fuel when the time (t) has reached the determined deactivation time (tab), ending the deactivation process.

3. The method according to claim 1, wherein in a subsequent process of deactivating the fuel-cell system (100)

the method comprises at least one of the following steps:

initiating a process of deactivating the fuel-cell system (100), monitoring the time (t) since the initiation of the deactivation process for excess of the determined deactivation time (tab), deactivating the supply of fuel when the time (t) has reached the determined deactivation time (tab), monitoring a current pressure (p) in the region (H, M, L) of the anode system (20) for falling below a minimum limit (Pmin), activating the supply of fuel when the pressure (p) has fallen below the minimum limit (Pmin) in order to raise the current pressure (p), deactivating the supply of fuel, and ending the deactivation process.

4. The method according to claim 3, wherein the method comprises at least one following step:

adjusting the determined deactivation time (tab), in dependence on the monitoring of the current pressure (p), wherein, for adjusting the determined deactivation time (tab), the determined deactivation time (tab) is increased by a lump sum (dt).

5. The method according to claim 1, wherein the deactivation process comprises a drying phase (202) of the anode system (20) and/or a bleed-down phase (203) of the fuel-cell system (100).

6. The method according to claim 1, wherein the method is carried out by an external computing unit.

7. The method according to claim 1, wherein the method is carried out multiple times.

8. The method according to claim 2, wherein the method is carried out during a normal operation of the fuel-cell system (100).

9. The method according to claim 8, wherein at least one operating parameter of the fuel-cell system (100) is considered.

10. A control unit comprising a memory unit in which a code is stored and a computing unit, wherein, the computing unit is configured to initiate a process of deactivating an fuel-cell system (100), monitor a time (t) since the initiation of the deactivation process for excess of a determined deactivation time (tab), deactivate a supply of fuel when the time (t) has reached the determined deactivation time (tab), monitor a current pressure (p) in a region (H, M, L) of a anode system (20) for falling below a minimum limit (Pmin), activate the supply of fuel when the pressure (p) has fallen below the minimum limit (Pmin) in order to raise the current pressure (p), deactivate the supply of fuel, and end the deactivation process.

11. A non-transitory, computer-readable media comprising commands that, when executed by a computer, cause the computer to initiate a process of deactivating a fuel-cell system (100), monitor a time (t) since the initiation of the deactivation process for excess of a determined deactivation time (tab), deactivate a supply of fuel when the time (t) has reached the determined deactivation time (tab), monitor a current pressure (p) in a region (H, M, L) of an anode system (20) for falling below a minimum limit (Pmin), activate the supply of fuel when the pressure (p) has fallen below the minimum limit (Pmin) in order to raise the current pressure (p), deactivate the supply of fuel, and end the deactivation process.

* * * * *